United States Patent
O'Leary et al.

(10) Patent No.: US 9,296,368 B2
(45) Date of Patent: Mar. 29, 2016

(54) DETERMINING EFFECTIVE BRAKE PEDAL POSITION

(71) Applicant: GM GLOBAL TECHNOLOGY OPERATIONS LLC, Detroit, MI (US)

(72) Inventors: Patrick J. O'Leary, Clinton Township, MI (US); Bret J. Keller, Livonia, MI (US); Barbara A. Shuler, Brighton, MI (US); Eric E. Krueger, Chelsea, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 132 days.

(21) Appl. No.: 14/067,490

(22) Filed: Oct. 30, 2013

(65) Prior Publication Data

US 2015/0120159 A1 Apr. 30, 2015

(51) Int. Cl.
 *B60T 7/06* (2006.01)
 *B60T 7/04* (2006.01)
 *B60W 20/00* (2006.01)

(52) U.S. Cl.
 CPC . *B60T 7/04* (2013.01); *B60T 7/042* (2013.01); *B60T 7/06* (2013.01); *B60W 20/00* (2013.01)

(58) Field of Classification Search
 CPC ........... B60T 7/04; B60T 7/042; B60T 13/74; B60T 13/66; B60W 20/00
 See application file for complete search history.

(56) References Cited

U.S. PATENT DOCUMENTS

| | | | | |
|---|---|---|---|---|
| 6,129,425 A | * | 10/2000 | Onuma | B60T 17/221 303/113.4 |
| 7,706,953 B1 | * | 4/2010 | Sun | B60K 31/042 123/399 |
| 2006/0212207 A1 | * | 9/2006 | Sugano | B60W 10/06 701/93 |
| 2014/0066255 A1 | * | 3/2014 | Yu | F02N 11/0822 477/203 |
| 2014/0067239 A1 | * | 3/2014 | Doering | F02N 11/0822 701/112 |
| 2014/0288798 A1 | * | 9/2014 | Ando | B60W 30/14 701/93 |

* cited by examiner

*Primary Examiner* — John Q Nguyen
*Assistant Examiner* — Jordan S Fei
(74) *Attorney, Agent, or Firm* — Ingrassia Fisher & Lorenz, P.C.

(57) ABSTRACT

Methods, systems, and vehicles are provided for determining an effective brake pedal position for a vehicle. A determination is made as to whether automatic braking is occurring for a vehicle. If the automatic braking is occurring, a measure of braking is determined for the vehicle. The effective pedal position of the brake pedal is determined to be a position of the brake pedal that would be expected to be required to attain the measure of braking if automatic braking were not occurring.

20 Claims, 4 Drawing Sheets

DETERMINING EFFECTIVE BRAKE PEDAL POSITION

TECHNICAL FIELD

The present disclosure generally relates to the field of vehicles and, more specifically, to methods and systems for determining effective brake pedal position in vehicles, such as automobiles.

BACKGROUND

Many vehicles today have systems that utilize automatic braking commands. Certain examples of system systems include adaptive cruise control, electric park braking, and vehicle hill hold, among others. By way of an illustrative example, adaptive cruise control (ACC) systems detect vehicles in front of the host vehicle and maintain an appropriate safety distance between the vehicles. Certain vehicles include a version of ACC in the form of a full speed range adaptive cruise control system (FSRACC). While a standard ACC system would typically only function with vehicle speeds greater than approximately twenty miles per hour (20 mph), FSRACC systems typically operate at any vehicle speed, include those less than or equal to twenty miles per hour (20 mph).

For certain vehicle functions (such as an automatic stop/start feature for a vehicle's engine), a position of the brake pedal is a trigger. For example, an automatic engine stop/start feature (such as that mentioned above) typically uses a driver's engagement of the brake pedal as a trigger in stopping the engine or battery, and typically uses a driver's release of the brake pedal as a trigger in re-starting the engine or battery. However, during an automatic braking event (such as during FSRACC operation), a driver may not be actively engaging or releasing the brake pedal, and/or such engagement or release of the brake pedal may not serve as an accurate measure of braking or intended braking.

Accordingly, it is desirable to provide improved alternatives for values of a driver's engagement or release of a brake pedal of a vehicle, for example during automatic braking via an FSRACC system and/or other systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises the steps of determining whether automatic braking is occurring for a vehicle, and, if automatic braking is occurring, determining a measure of braking for the vehicle, and determining an effective pedal position of the brake pedal to be a position of the brake pedal that would be expected to be required to attain the measure of braking if automatic braking were not occurring.

In accordance with another exemplary embodiment, a system is provided. The system comprises a non-transitory, computer-readable memory and a processor. The non-transitory, computer-readable memory stores a program that is configured to at least facilitate determining whether automatic braking is occurring for a vehicle, and, if automatic braking is occurring, determining a measure of braking for the vehicle, and determining an effective pedal position of the brake pedal to be a position of the brake pedal that would be expected to be required to attain the measure of braking if automatic braking were not occurring. The processor executes the program.

In accordance with a further exemplary embodiment, a vehicle is provided. The vehicle comprises a drive system, a braking module, and an adaptive cruise control system. The braking module has a regenerative braking capability and/or a friction braking capability. The adaptive cruise control system is coupled to the drive system and the braking module, and is configured to at least facilitate determining whether automatic braking is occurring for a vehicle, and, if, automatic braking is occurring, determining a measure of regenerative braking for the vehicle, determining a measure of friction braking for the vehicle, determining an aggregate measure of braking based on the measure of regenerative braking and the measure of friction braking, and determining an effective pedal position of the brake pedal to be a position of the brake pedal that would be expected to be required to attain the aggregate measure of braking if automatic braking were not occurring.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
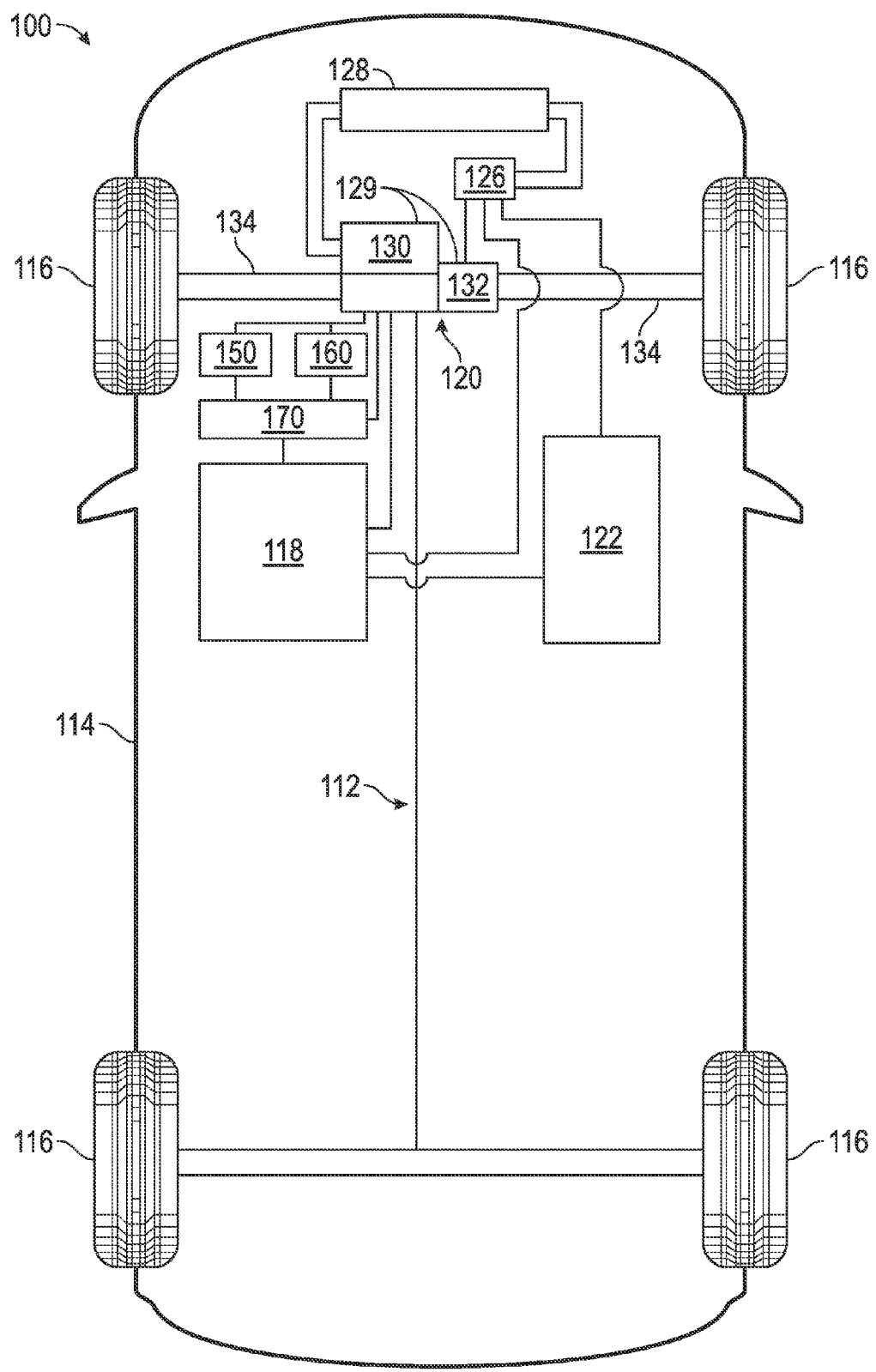
FIG. 1 is a functional block diagram of a vehicle that includes an adaptive cruise control system, in accordance with an exemplary embodiment.

FIG. 1 illustrates a vehicle 100, or automobile, according to an exemplary embodiment. The vehicle 100 is also referenced at various points throughout this Application as the vehicle. As described in greater detail further below, the vehicle 100 includes a full speed range adaptive cruise control system ("ACCS") 170 that provides automatic braking for the vehicle, an automatic engine stop/start feature for the vehicle, and determines an effective pedal position for the brake pedal of the vehicle, for example for use as in input for automatic engine stop/start functionality for the vehicle during automatic braking during FSRACC 170 operation.

As depicted in FIG. 1, the vehicle 100 includes a chassis 112, a body 114, four wheels 116, an electronic control system 118, a steering system 150, a braking system 160, and the above-referenced FSRACC 170. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 (as well as each of the target vehicles and third vehicles) may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In one exemplary embodiment of the vehicle 100 illustrated in FIG. 1, the vehicle 100 is a hybrid electric vehicle (HEV), and further includes an actuator assembly 120, an energy storage system (ESS) 122, a power inverter assembly (or inverter) 126, and a radiator 128. However, this may vary in other embodiments, for example in that the vehicle 100 may not comprise an HEV in other embodiments. The actuator assembly 120 includes at least one electric propulsion system 129 mounted on the chassis 112 that drives the wheels 116. In the depicted embodiment, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130. In certain other embodiments, the vehicle 100 may not be an HEV vehicle, but may still have engine start/stop functionality. In this case the engine could be stopped by shutting off the fuel to the engine. The starter motor and battery present on a base vehicle could then be used to restart the engine when appropriate.

The ESS 122 is mounted on the chassis 112, and is electrically connected to the inverter 126. The ESS 122 preferably comprises a battery having a pack of battery cells. In one embodiment, the ESS 122 comprises a lithium iron phosphate battery, such as a nanophosphate lithium ion battery. Together the ESS 122 and electric propulsion system(s) 129 provide a drive system to propel the vehicle 100.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the combustion engine 130 and the inverter 126.

The steering system 150 is mounted on the chassis 112, and controls steering of the wheels 116. The steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, inputs via a cruise control resume switch (not depicted), and various other inputs for various vehicle devices and/or systems, such as one or more vehicle radios, other entertainment systems, environmental control systems, lightning units, navigation systems, and the like (also not depicted). In one exemplary embodiment, the braking system 160 includes both a regenerative braking capability and a friction braking capability for the vehicle 100. In another exemplary embodiment, the braking system 160 includes only friction braking capability.

The FSRACC 170 is mounted on the chassis 112. The FSRACC 170 may be coupled to various other vehicle devices and systems, such as, among others, the actuator assembly 120, the steering system 150, the braking system 160, and the electronic control system 118. The FSRACC 170 provides cruise control functionality for the vehicle 100 while maintaining a safe distance between the vehicle 100 and other vehicles in front of the vehicle 100. In addition, as mentioned above, the FSRACC 170 provides automatic braking for the vehicle, an automatic engine stop/start feature for the vehicle, and determines an effective pedal position for the brake pedal of the vehicle for use in such automatic engine stop/start features during automatic braking while the FSRACC 170 is in operation.

Figure 2:
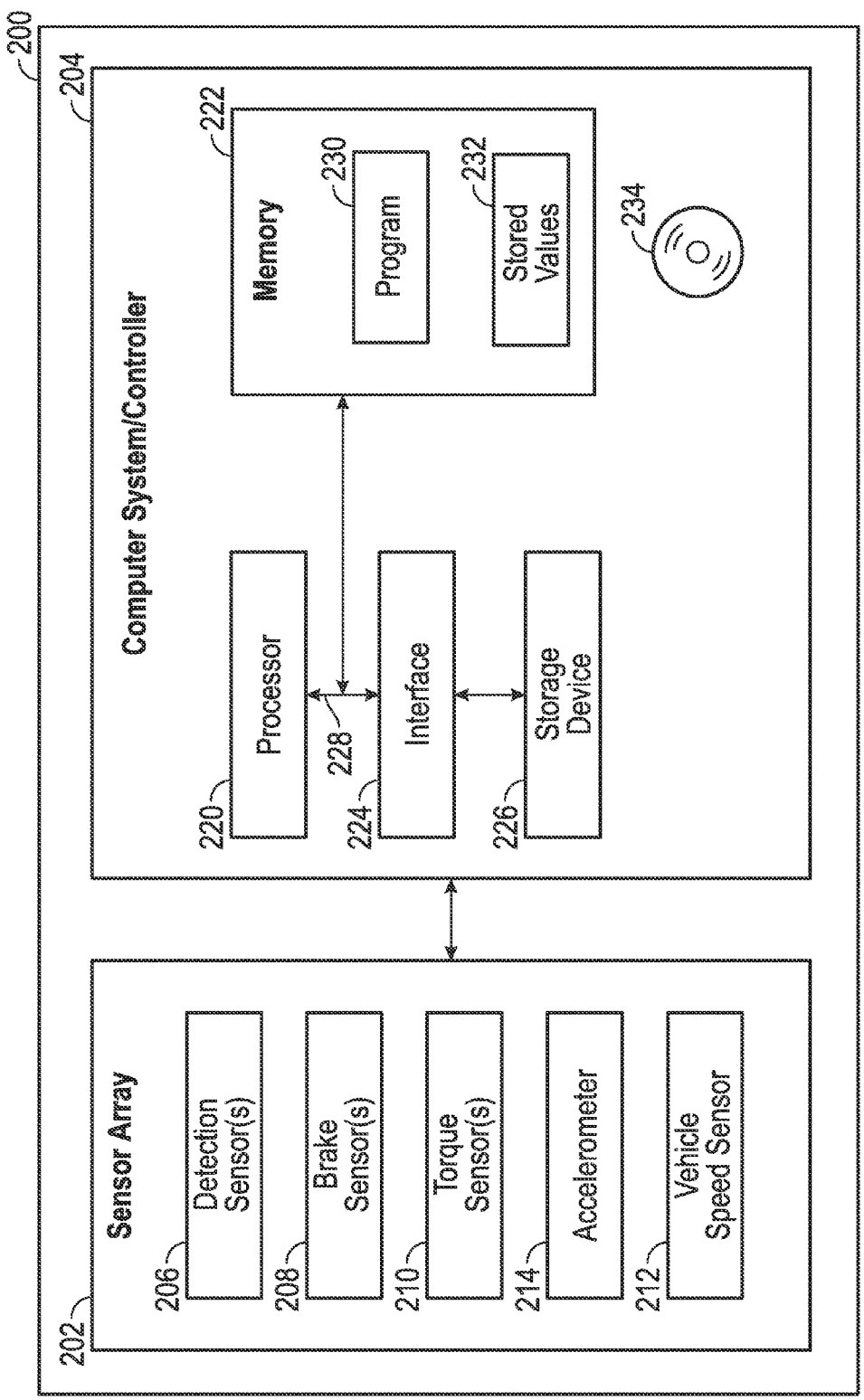
FIG. 2 is a functional block diagram of a system for performing cruise control functionality for the vehicle, including the determination of an effective brake pedal position during cruise control operation for use in performing automatic engine stop/start functionality for the vehicle, and that can be used in connection with the vehicle of FIG. 1, in accordance with an exemplary embodiment.

With reference to FIG. 2, a functional block diagram is provided for a system 200 for use in operating cruise control functionality for the vehicle, including the determination of an effective brake pedal position during cruise control operation for performing an automatic engine stop/start feature for the vehicle, in accordance with an exemplary embodiment. In one embodiment, the system 200 may comprise, in whole or in part, the FSRACC 170 and/or portions thereof, along with portions of certain other systems and/or devices of the vehicle 100 of FIG. 1, for example as discussed below. As depicted in FIG. 2, the system 200 includes a sensor array 202 and a controller 204.

The sensor array 202 measures and obtains information for use by the controller 204 in determining effective brake pedal position during automatic braking. As depicted in FIG. 2, the sensor array 202 includes one or more detection sensors 206, brake pedal sensors 208, torque sensors 210, vehicle velocity sensors 212, and accelerometers 214.

The detection sensors 206 are used to detect target vehicles in proximity to the vehicle and other nearby vehicles, and to obtain information pertaining thereto (such as information pertaining to position and movement of the target vehicles) for use in maintaining an appropriate distance between the host vehicle and the target vehicles. In the depicted embodiment, the detection sensors 206 include one or more cameras and/or other vision-based detection devices, radar devices (such as long and short range radar detection devices), and/or other target vehicle detection devices such as, by way of example, light detection and ranging (LIDAR) and/or vehicle-to-vehicle (V2V) communications. In one embodiment, the detection sensors 206 are disposed in a front portion of the vehicle.

The brake pedal sensors 208 are coupled to or part of the braking system 160 of FIG. 1. The brake pedal sensors 208 preferably include at least one brake pedal position sensor. The brake pedal position sensor measures a position of the brake pedal or an indication as to how far the brake pedal has traveled when the operator applies force to the brake pedal.

In certain embodiments, torque sensors 210 measure values of torque (including regenerative braking torque and friction braking torque) for the vehicle. In one such embodiment, the torque sensors 210 are disposed proximate an axle of the vehicle (not depicted in FIG. 2). In other embodiments, the torque values may be estimated instead using models. By way of example, such a model may consist firstly in estimating the brake pressure that has been applied using, for example, hydraulic valve on/off times, electric motor current, pressure sensor, and the like, and secondly in converting the magnitude of applied pressure to brake torque using brake system information such as the caliper piston area, the coefficient of friction of the brake lining material, and the rotor effective radius.

The vehicle velocity sensor 212 measures a velocity of the vehicle. In one embodiment, the vehicle velocity sensor 212 is part of the electronic control system 118. This may vary in certain embodiments. For example, in one embodiment, wheel speed sensors (not depicted) may be used by the controller 204 for calculating vehicle speed.

The accelerometer 214 measures an acceleration of the vehicle. In one embodiment, the accelerometer 214 is part of the electronic control system 118. In certain other embodiments, vehicle acceleration values are instead calculated by the controller 204 using velocity values, for example as calculated using velocity values that are measured by the vehicle velocity sensor 212 and/or that are calculated using wheel speed sensors.

The controller 204 is coupled to the sensor array 202. The controller 204 processes the data and information received from the sensor array 202, and operates cruise control functionality for the vehicle, including the determination of an effective brake pedal position for use for automatic engine stop/start functionality during automatic braking while the cruise control system is in operation. In one embodiment, the controller 104 performs these features in accordance with the steps of the process 300 depicted in FIGS. 3 and 4 and described below in connection therewith.

As depicted in FIG. 2, the controller 204 comprises a computer system. In certain embodiments, the controller 204 may also include one or more of the detection sensors 206. In addition, it will be appreciated that the controller 204 may otherwise differ from the embodiment depicted in FIG. 2. For example, the controller 204 may be coupled to or may otherwise utilize one or more remote computer systems and/or other control systems.

In the depicted embodiment, the computer system of the controller 204 includes a processor 220, a memory 222, an interface 224, a storage device 226, and a bus 228. The processor 220 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 220 executes one or more programs 230 contained within the memory 222 and, as such, controls the general operation of the controller 204 and the computer system of the controller 204, preferably in executing the steps of the processes described herein, such as the steps of the process 300 (and any sub-processes thereof) in connection with FIGS. 3 and 4.

The memory 222 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 222 is located on and/or co-located on the same computer chip as the processor 220. In the depicted embodiment, the memory 222 stores the above-referenced program 230 along with one or more stored values 232 (preferably, including look-up tables) for use in operating cruise control functionality for the vehicle, including the determination of an effective brake pedal position during cruise control operation.

The bus 228 serves to transmit programs, data, status and other information or signals between the various components of the computer system of the controller 204. The interface 224 allows communication to the computer system of the controller 204, for example from a system driver and/or another computer system, and can be implemented using any suitable method and apparatus. It can include one or more network interfaces to communicate with other systems or components. The interface 224 may also include one or more network interfaces to communicate with technicians, and/or one or more storage interfaces to connect to storage apparatuses, such as the storage device 226.

The storage device 226 can be any suitable type of storage apparatus, including direct access storage devices such as hard disk drives, flash systems, floppy disk drives and optical disk drives. In one exemplary embodiment, the storage device 226 comprises a program product from which memory 222 can receive a program 230 that executes one or more embodiments of one or more processes of the present disclosure, such as the steps of the process 300 (and any sub-processes thereof) of FIGS. 3 and 4, described further below. In another exemplary embodiment, the program product may be directly stored in and/or otherwise accessed by the memory 222 and/or a disk (e.g., disk 234), such as that referenced below.

The bus 228 can be any suitable physical or logical means of connecting computer systems and components. This includes, but is not limited to, direct hard-wired connections, fiber optics, infrared and wireless bus technologies. During operation, the program 230 is stored in the memory 222 and executed by the processor 220.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 220) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
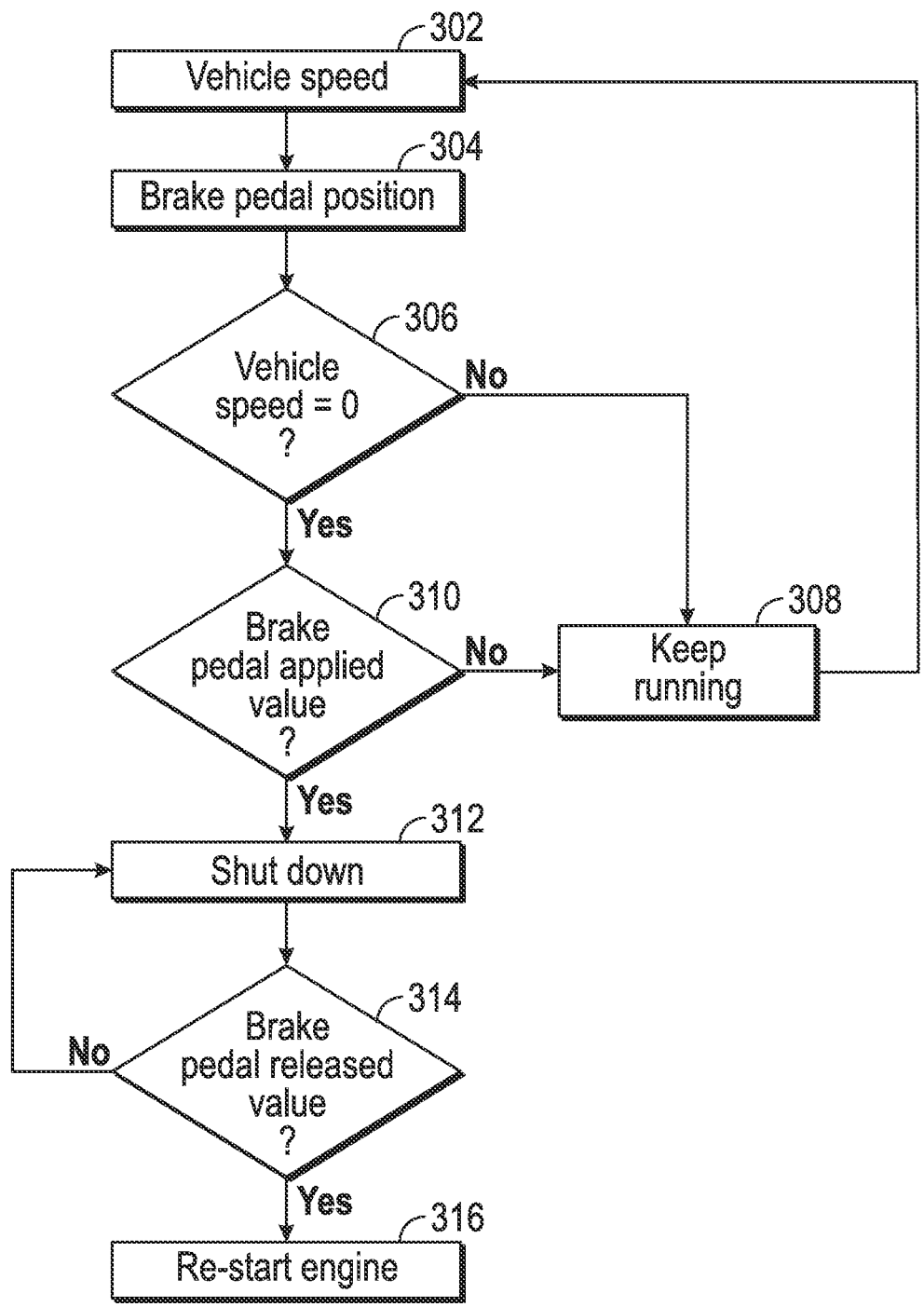
FIG. 3 is a flowchart of a process for performing an automatic engine stop/start function for a vehicle, and that can be used in connection with the vehicle of FIG. 1 and the systems of FIGS. 1 and 2.

FIG. 3 is a flowchart of a process 300 for performing an automatic engine stop/start function of a vehicle, in accordance with an exemplary embodiment. In one embodiment, the process 300 is implemented in connection with the vehicle 100 of FIG. 1 and the system 200 of FIG. 2. The process 300 will also be described further below in connection with FIG. 4, which depicts a sub-process thereof, namely, the determination of an effective brake pedal position, in accordance with an exemplary embodiment. The process 300 can be used in connection with the vehicle 100 of FIGS. 1 and 2, including the FSRACC 170 of FIG. 1 and the system 200 of FIG. 2. The process 300 is preferably performed continuously during a current drive cycle (or ignition cycle) of the vehicle. In certain embodiments the process 300 may be implemented in connection with hybrid vehicles. In other embodiments, the process 300 may be implemented in connection with non-hybrid applications with automatic engine stop/start functionality.

As depicted in FIG. 3, the process 300 includes the step of determining a speed of the vehicle (step 302). In one embodiment, the vehicle speed is measured by the vehicle speed sensor 212 of FIG. 2. In certain embodiments, the vehicle speed may be calculated by the processor 220 of FIG. 2, for example, based on wheel speed values.

An effective pedal position is determined for a brake pedal of the vehicle (step 304). Depending on whether a cruise control function of the vehicle is in operation and an automatic braking event is occurring for the vehicle, the effective brake pedal position either comprises a measured physical position of the brake pedal or a calculated effective brake pedal position. In the event of automatic braking during cruise control operation, the calculated effective brake pedal position comprises a position of the brake pedal that would be expected to be required to attain the measure of braking being experienced by the vehicle if automatic braking were not occurring, in accordance with the steps of FIG. 4 discussed in further greater below.

Figure 4:
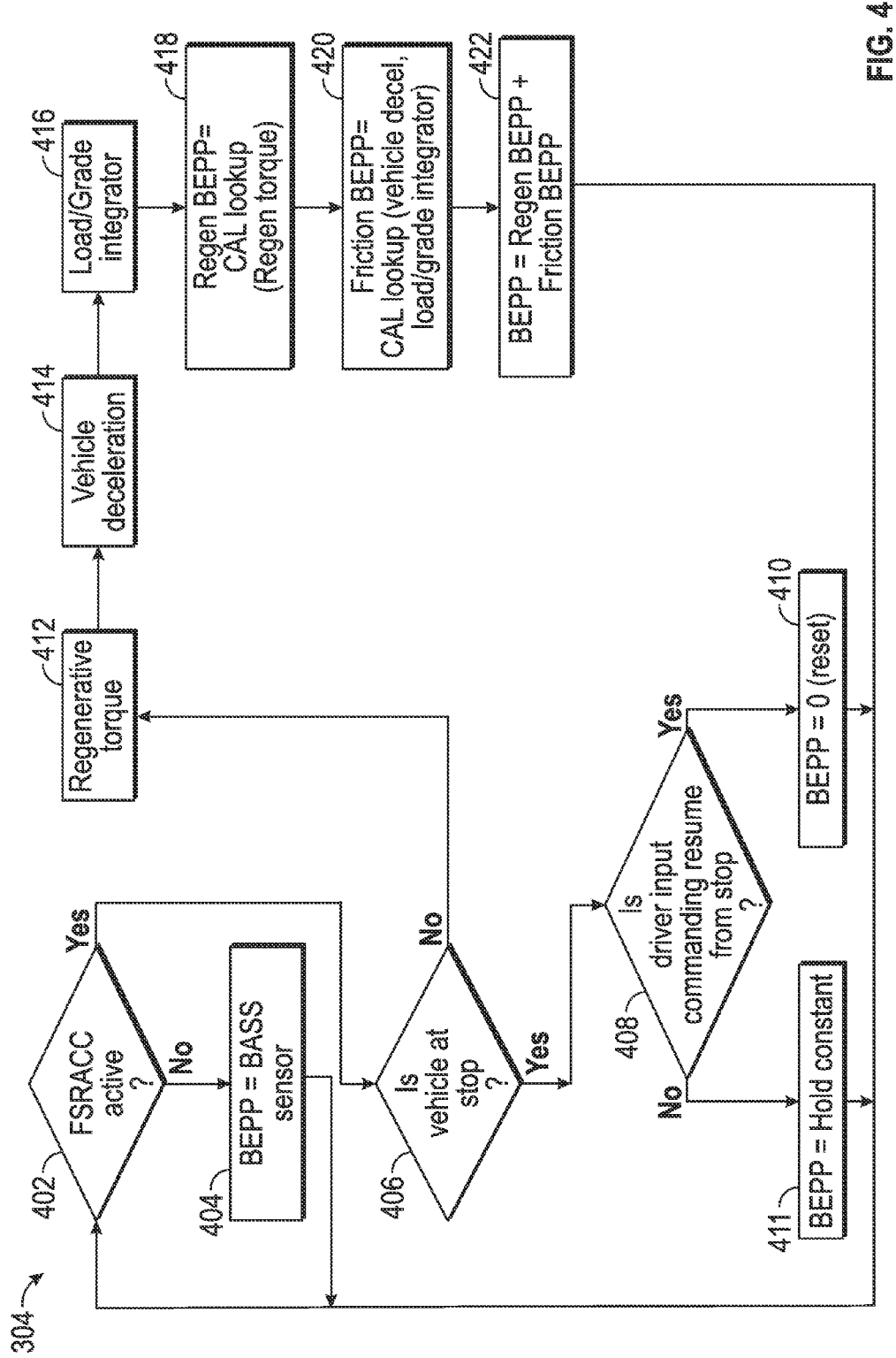
FIG. 4 is a flowchart of a combined step of the process of FIG. 3, including the determination of an effective brake pedal position of a brake pedal of the vehicle, and that can be used in connection with the vehicle of FIG. 1 and the systems of FIGS. 1 and 2.

Turning to FIG. 4, a flowchart is provided for the step (or sub-process) 304 of the process 300, namely, determining the effective brake pedal position, in accordance with an exemplary embodiment. As depicted in FIG. 4, a determination is made as to whether automatic braking is occurring while a particular feature of the vehicle is in operation with respect to a system that utilizes an automatic braking command or feature (step 402). In certain embodiments, the determination of step 402 comprises a determination as to whether automatic braking is occurring while an adaptive cruise control feature is in operation. In one such embodiment, the determination of step 402 comprises a determination as to whether automatic braking is occurring while a full speed range adaptive cruise control feature is in operation. In other embodiments, the determination may pertain to a feature other than adaptive cruise control or full speed range adaptive cruise control, such as electric park brake, hill hold, or the like. The determination of step 304 is preferably made by the processor 220 of FIG. 2. As used herein, "automatic braking" refers to braking that is initiated by the vehicle itself rather than by inputs provided by the driver (for example, as may occur if the vehicle is approaching too closely to another vehicle, or the like). Also as used herein, "adaptive cruise control" (or "ACC") refers to a cruise control system for a vehicle that automatically changes vehicle parameters (e.g. vehicle speed) based on conditions surrounding the vehicle, such as if another vehicle is in close proximity thereto (e.g. to maintain an appropriate distance between vehicles). In addition, as used herein, "full speed range adaptive cruise control" (or "FSRACC") refers to an ACC feature that is used for any vehicle speed, including at low speeds at or near zero miles per hour (0 mph).

If it is determined in step 402 that all features that can activate automatic braking are not active, that an ACC feature (or other feature, per the discussion above) is not operating, or both, then the effective pedal position of the brake pedal is determined to be equal to a measured value of the actual, physical position of the brake pedal as measured by the brake pedal sensor 208 of FIG. 2 (step 404). In one embodiment, the effective pedal position of the brake pedal is determined to be equal to a measured value of the actual, physical position of the brake pedal as measured by the brake pedal sensor 208 of FIG. 2 if all features that can activate automatic braking are not active, a FSRACC feature is not operating, or both. The effective brake pedal position is preferably continuously determined in this manner until a determination is made in a subsequent iteration of step 402 that at least one of the features that can activate automatic braking is active while an ACC feature (or, in some embodiments, a FSRACC feature and/or another feature using automatic braking commands, per the discussion above) is in operation.

Once a determination is made in step 402 that at least one of the features that can activate automatic braking is active while an ACC feature (or, in some embodiments, a FSRACC feature or another feature using automatic braking commands) is in operation, then the process proceeds to step 406. During step 406, a determination is made as to whether the vehicle is at a stop. This determination is preferably made by the processor 220 of FIG. 2 based on the vehicle speed from step 302 of FIG. 3.

If it is determined in step 406 that the vehicle is at a stop, then a determination is made as to whether a driver of the vehicle is commanding a resumption of movement of the vehicle (step 408). The determination of step 408 is preferably made by the processor 220 of FIG. 2. In one embodiment, this determination may be based on whether the driver is engaging an accelerator pedal of the vehicle (e.g., as detected by a non-depicted accelerator pedal sensor). In another embodiment, this determination may be based on whether the driver is initiating a resume switch of the adaptive cruise control system (e.g., as detected by a non-depicted resume switch sensor).

If it is determined in step 408 that the driver is commanding a resumption of movement of the vehicle, then the effective brake pedal position is re-set to a value equal to zero (step 410). This step is preferably performed by the processor 220 of FIG. 2. The process then proceeds to step 402, discussed above.

Conversely, if it is determined in step 408 that the driver is not commanding a resumption of movement of the vehicle, then the effective brake pedal position is determined from a table lookup. The value from the table lookup is intended to be representative of a typical brake pedal apply required to keep the vehicle stopped when automatic braking is not occurring, an ACC feature is not operating, or both, The process then proceeds to step 402, discussed above.

Returning to step 406, if it is determined in step 406 that the vehicle is not stopped, then the process proceeds to step 412. During step 412, a regenerative torque is measured (step 412). Preferably, during step 412, the regenerative torque comprises a measure of regenerative torque that is measured by a torque sensor 210 of FIG. 2 and provided to one or more axles of the vehicle via instructions provided by the processor 220 of FIG. 2.

In addition, a vehicle deceleration is determined (step 414). In one embodiment, the vehicle deceleration is measured by the accelerometer 214 of FIG. 2. In another embodiment, the vehicle deceleration is calculated by the processor 220 based on changes of the vehicle speed of step 302 of FIG. 3 over time.

A measure of a load of the vehicle is determined (step 416). In one embodiment, the measure of load is calculated using a measure of torque delivered at the wheels of the vehicle, i.e., the actual axle torque (for example, as measured by torque sensors 210 of FIG. 2) as well as a difference between a measured and predicted acceleration of the vehicle (for example, as calculated by the processor 220 of FIG. 2 based on values obtained from the accelerometer 214 of FIG. 2). In one such embodiment, the processor 220 of FIG. 2 calculates the measure of load by using a load grade integrator using these values as inputs. The load integrator can translate the actual axle torque through a vehicle model to create a predicted vehicle acceleration.

In one example discussed in detail directly below, a concept is utilized that by knowing the vehicle characteristics, such as nominal vehicle mass, tire radius and vehicle road load coefficients along with the currently delivered axle torque (actual axle torque), the processor can compute the expected acceleration, also called the predicted acceleration. In this example, the road load coefficients define what force is needed to maintain a steady state speed. Multiplying this by the tire radius translates this term to the axle torque domain. Then, subtracting this road load axle torque from the actual axle torque provides the net axle torque to accelerate the vehicle and compensate for external loads in this example. The integrator as described in the following text will continuously compensate for the external loads in this example. This integrator term is then subtracted from the net axle torque, which leaves us with the remaining axle torque, which represents the axle torque associated with the predicted acceleration. Next we use the well know formula, force equals mass times acceleration (F=m*a). We divide this predicted acceleration axle torque by the tire radius to get net force. Then we divide this term by the nominal mass and derive the predicted acceleration. To complete the closed loop control, this predicted acceleration term is subtracted from the measured acceleration. This difference represents the difference between the expected vehicle acceleration and the actual acceleration. This difference is integrated in a typical closed loop control. This closed loop control calculates an integrator value, which is added into the requested axle torque request to cause the measured acceleration to match the predicted acceleration. As the closed loop continues to integrate and provide compensation, the predicted acceleration will match the measured acceleration. This integrator thus represents the external loads on the vehicle. The measure of load is representative of the external loads experienced by a vehicle (for example, due to weight within the vehicle, the angle and direction of the road grade, winds, and the like).

A regenerative component of the effective brake pedal position is determined (step 418). In one embodiment, the regenerative component is determined by the processor 220 of FIG. 2 using the regenerative torque value of step 412. Specifically, in one embodiment, the regenerative component of the effective brake pedal position is determined in step 418 using the regenerative torque value of step 412 along with a look-up table (preferably stored in the memory 222 of FIG. 2 as one of the stored values 232 therein) in order to find a brake pedal travel position that corresponds to the amount of regenerative braking torque. In other words, in a preferred embodiment, the look-up table is used to ascertain a particular brake pedal travel position that would be expected to be required, in the absence of automatic braking, to result in the amount of braking associated with the regenerative braking torque (for example, based on historical data, studies, or the like). It will be appreciated that in certain embodiments the braking system may not include a regenerative braking component, and thus that step 418 may not be performed in such embodiments.

A friction component of the effective brake pedal position is also determined (step 420). In one embodiment, the friction component of the effective brake pedal position is determined in step 420 using the vehicle deceleration value of step 414 and the measure of load of the vehicle of step 416 along with a look-up table (preferably stored in the memory 222 of FIG. 2 as one of the stored values 232 therein) in order to find a brake pedal travel position that corresponds to the vehicle deceleration and the measure of the load of the vehicle. In other words, in a preferred embodiment, the look-up table is used to ascertain a particular brake pedal travel position that would be expected to be required, in the absence of automatic braking, to result in the amount of friction braking associated with the vehicle deceleration and the measure of the load of the vehicle (for example, based on historical data, studies, or the like).

The effective brake pedal position (also referred to herein as the aggregate effective brake pedal position) is determined by aggregating the regenerative component of step 418 (if any) and the friction component of step 420 (step 422). In one embodiment, the aggregate effective brake pedal position is calculated during step 422 by the processor 220 of FIG. 2 by adding the regenerative braking component of step 418 with the friction component of step 420. The process then returns to step 402, described above.

Returning to FIG. 3, the effective brake pedal position of the sub-process 304 of FIG. 4 is used in controlling the engine stop/start feature for the vehicle. Specifically, in step 306, a determination is made as to whether the vehicle speed is equal to zero. This determination is preferably made by the processor 220 of FIG. using the vehicle speed of step 302.

If it is determined in step 306 that the vehicle speed is not equal to zero, then the "stop" feature is not implemented (step 308). In one example in which the stop/start feature pertains to the stopping and starting of a vehicle engine, the engine remains running (and is not stopped) in step 308. Step 308 is preferably controlled by the processor 220 of FIG. 2.

Conversely, if it is determined in step 306 that the vehicle speed is equal to zero, then a determination is made as to whether the effective brake pedal position of FIG. 4 is consistent with the brake pedal being applied (step 310). In one embodiment, during step 310, the effective brake pedal position of FIG. 4 is determined to be consistent with the brake pedal being applied in step 310 if the effective brake pedal position represents brake pedal travel in a direction toward the fully depressed (i.e. braking) position that is greater than a predetermined threshold value. In other words, the determination of step 310 would be deemed to be a "yes" if the driver is actually engaging the brake pedal in a sufficient amount, or if automatic braking is applied in a sufficient corresponding amount. In one embodiment, the predetermined threshold value is equal to zero, so that an effective brake pedal position representing any corresponding non-zero brake pedal travel (e.g., including a driver tap on the brakes or an equivalent amount of automatic braking) would trigger a "yes" determination in step 310. In other embodiments, the predetermined threshold value may be greater than zero, so that that a "yes" determination is triggered in step 310 only if the driver's engagement of the brake pedal, or an equivalent amount of automatic braking, exceeds a higher threshold. For example, in one embodiment the threshold may be equal to twenty percent of maximum brake pedal travel for the braking system of the vehicle, although this may vary in other embodiments. The determination of step 310 is preferably made by the processor 220 of FIG. 2.

If it is determined in step 310 that the effective brake pedal position is consistent with the brake pedal being applied, then the "stop" feature is implemented (step 312). In one example in which the stop/start feature pertains to the stopping and starting of a vehicle engine, the engine is automatically stopped (or turned off) in step 312. Step 312 is preferably implemented by the processor 220 of FIG. 2. The process then proceeds to step 314, described further below. Conversely, if it is determined in step 310 that the effective brake pedal position is not consistent with the brake pedal being applied, then the process proceeds instead to step 308, and the "stop" feature is not implemented (as discussed above in connection with step 308).

During step 314, a determination is made as to whether a most recent value of effective brake pedal position of FIG. 4 is consistent with the brake pedal being released. In one embodiment, during step 314, the effective brake pedal position of FIG. 4 is determined to be consistent with the brake pedal being released in step 314 if the effective brake pedal position represents brake pedal travel toward the released (i.e. non-braking) position that is less than a predetermined position threshold value. In other words, the determination of step 314 would be deemed to be a "yes" if the driver is actually releasing the brake pedal in a sufficient amount, or if automatic braking is reduced by a sufficient corresponding amount. The determination of step 314 is preferably made by the processor 220 of FIG. 2.

If it is determined in step 314 that the effective brake pedal position is consistent with the brake pedal being released, then the "start" feature is implemented (step 316). In one example in which the stop/start feature pertains to the stopping and starting of a vehicle engine, the engine is automatically re-started (or turned on) in step 316. Step 316 is preferably implemented by the processor 220 of FIG. 2.

Conversely, if it is determined in step 314 that the effective brake pedal position is not consistent with the brake pedal being released, then the "start" feature is not implemented. Instead, the process returns to step 312, and the engine remains shut down until a determination is made in a subsequent iteration of step 314 that the effective brake pedal position is consistent with the brake pedal being released.

Accordingly, methods, systems, and vehicles are provided for determining an effective pedal position of a brake pedal of a vehicle, and for using the effective pedal position for automatic engine stop/start features for vehicle engines, including during full speed range adaptive cruise control operation. The disclosed methods, systems, and vehicles provide for implementation of such automatic engine stop/start functionality regardless of whether the brake pedal applied, so that the automatic engine stop/start functionality can still be used during automatic braking in full speed range adaptive cruise control. This provides for potential improvements, for example in fuel economy, from the potentially increased utilization of the automatic engine stop/start functionality. In addition, such potential benefits can be obtained without entirely redesigning the automatic engine stop/start functionality, for example because the effective brake pedal position can be utilized with many existing algorithms for engine stop/start functionality.

It will be appreciated that the vehicle of FIG. 1, and/or the systems of FIG. 1, and/or components thereof, may vary in different embodiments. It will also be appreciated that various steps of the process 300 described herein in connection with FIGS. 3 and 4 may vary in certain embodiments. It will similarly be appreciated that various steps of the process 300 described herein in connection with FIGS. 3 and 4 may occur simultaneous with one another, and/or in a different order as presented in FIGS. 3 and 4 and/or as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method comprising:
    determining whether automatic braking is occurring for a vehicle having a brake pedal using a processor of an adaptive cruise control system of a computer system for the vehicle; and
    if automatic braking is occurring:
        determining a measure of braking for the vehicle using measurements from one or more torque sensors of the vehicle;
        determining, via the processor of the adaptive cruise control system of the computer system of the vehicle, an effective pedal position of the brake pedal to be a position of the brake pedal that would be expected to be required to attain the measure of braking if automatic braking were not occurring; and
    controlling, via the processor, a stop/start feature of the vehicle using the effective pedal position.

2. The method of claim 1, further comprising:
    determining whether the vehicle is in an adaptive cruise control mode;
    wherein the steps of determining the measure of braking for the vehicle and determining the effective pedal position of the brake pedal to be a position of the brake pedal that would be expected to be required to attain the measure of braking if automatic braking were not occurring are performed only if the vehicle is in the adaptive cruise control mode and automatic braking is occurring.

3. The method of claim 1, further comprising:
    determining whether the vehicle is in a full speed range adaptive cruise control mode;
    wherein the steps of determining the measure of braking for the vehicle and determining the effective pedal position of the brake pedal to be a position of the brake pedal that would be expected to be required to attain the measure of braking if automatic braking were not occurring are performed only if the vehicle is in the full speed range adaptive cruise control mode and automatic braking is occurring.

4. The method claim 1, further comprising:
    determining whether the vehicle is stopped;

if the vehicle is stopped, determining whether a driver of the vehicle is commanding a resumption of vehicle movement;

holding the effective pedal position of the brake pedal constant, if it is determined that the vehicle is stopped and the driver is not commanding a resumption of movement of the vehicle; and re-setting the effective pedal position of the brake pedal constant, if it is determined that the vehicle is stopped and the driver is commanding a resumption of movement of the vehicle.

5. The method of claim 1, wherein:

the vehicle has a regenerative braking capability;

the step of determining the measure of braking comprises measuring a regenerative braking torque for the vehicle; and the step of determining the effective pedal position of the brake pedal comprises determining the effective pedal position based at least in part on the regenerative braking torque.

6. The method of claim 1, wherein:

the vehicle has a friction braking capability;

the step of determining the measure of braking comprises measuring a friction braking torque for the vehicle; and the step of determining the effective pedal position of the brake pedal comprises determining the effective pedal position based at least in part on the friction braking torque.

7. The method of claim 6, wherein:

the step of determining the measure of braking further comprises determining a measure of a load for the vehicle; and the step of determining the effective pedal position of the brake pedal comprises determining the effective pedal position based at least in part on the deceleration and the measure of the load.

8. The method of claim 1, wherein:

the step of determining the measure of braking comprises determining a deceleration of the vehicle; and the step of determining the effective pedal position of the brake pedal comprises determining the effective pedal position based at least in part on the deceleration.

9. The method of claim 1, wherein:

the vehicle has a regenerative braking capability and a friction braking capability;

the step of determining the measure of braking comprises measuring a regenerative braking torque for the vehicle, determining a deceleration of the vehicle, and determining a measure of a load of the vehicle; and the step of determining the effective pedal position of the brake pedal comprises determining the effective pedal position based at least in part on the regenerative braking torque, the deceleration, and the measure of the load.

10. A system comprising:

a non-transitory, computer-readable memory storing a program for an adaptive cruise control system of a computer system of a vehicle, the program configured to at least facilitate:

determining whether automatic braking is occurring for a vehicle having a brake pedal; and if automatic braking is occurring:

determining a measure of braking for the vehicle using measurements from one or more torque sensors of the vehicle; and determining an effective pedal position of the brake pedal to be a position of the brake pedal that would be expected to be required to attain the measure of braking if automatic braking were not occurring; and a processor of the computer system of the vehicle, the processor configured to execute the program and to utilize the determined effective pedal position for controlling a stop/start feature of the vehicle using the effective pedal position.

11. The system of claim 10, wherein the program is further configured to at least facilitate:

determining whether the vehicle is in an adaptive cruise control mode; and determining the measure of braking for the vehicle and determining the effective pedal position of the brake pedal to be a position of the brake pedal that would be expected to be required to attain the measure of braking if automatic braking were not occurring only if the vehicle is in the adaptive cruise control mode and automatic braking is occurring.

12. The system of claim 10, wherein the program is further configured to at least facilitate:

determining whether the vehicle is in a full speed range adaptive cruise control mode; and determining the measure of braking for the vehicle and determining the effective pedal position of the brake pedal to be a position of the brake pedal that would be expected to be required to attain the measure of braking if automatic braking were not occurring only if the vehicle is in the full speed range adaptive cruise control mode and automatic braking is occurring.

13. The system of claim 10, wherein the program is further configured to at least facilitate:

determining whether the vehicle is stopped;

if the vehicle is stopped, determining whether a driver of the vehicle is commanding a resumption of vehicle movement;

holding the effective pedal position of the brake pedal constant, if it is determined that the vehicle is stopped and the driver is not commanding a resumption of movement of the vehicle; and re-setting the effective pedal position of the brake pedal constant, if it is determined that the vehicle is stopped and the driver is commanding a resumption of movement of the vehicle.

14. The system of claim 10, wherein the vehicle has a regenerative braking capability, and the program is further configured to at least facilitate:

measuring a regenerative braking torque for the vehicle; and determining the effective pedal position based at least in part on the regenerative braking torque.

15. The system of claim 10, wherein the program is further configured to at least facilitate:

determining the measure of braking comprises determining a deceleration of the vehicle; and determining the effective pedal position based at least in part on the deceleration.

16. The system of claim 15, wherein the program is further configured to at least facilitate:

determining a measure of a load for the vehicle; and determining the effective pedal position based at least in part on the deceleration and the measure of the load.

17. The system of claim 10, wherein the vehicle has a regenerative braking capability, and the program is further configured to at least facilitate:

measuring a regenerative braking torque for the vehicle, determining a deceleration of the vehicle, and determining a measure of a load of the vehicle; and determining the effective pedal position based at least in part on the regenerative braking torque, the deceleration, and the measure of the load.

18. The system of claim 10, wherein the vehicle has a friction braking capability, and the program is further configured to at least facilitate:

measuring a friction braking torque for the vehicle, determining a deceleration of the vehicle, and determining a measure of a load of the vehicle; and determining the effective pedal position based at least in part on the friction braking torque, the deceleration, and the measure of the load.

19. A vehicle comprising:

a drive system;

a braking module with a regenerative braking capability and a friction braking capability and including a brake pedal;

an adaptive cruise control system coupled to the drive system and the braking module, wherein the adaptive cruise control system is part of a computer system of the vehicle, and is configured to at least facilitate:

determining whether automatic braking is occurring for the vehicle; and if automatic braking is occurring:

determining a measure of regenerative braking for the vehicle;

determining a measure of friction braking for the vehicle;

determining an aggregate measure of braking based on the measure of regenerative braking and the measure of friction braking; and determining an effective pedal position of the brake pedal to be a position of the brake pedal that would be expected to be required to attain the aggregate measure of braking if automatic braking were not occurring, for use by a processor of the adaptive computer system of the computer system of the vehicle for controlling the adaptive cruise control system of the computer system of the vehicle; and a processor configured to control a stop/start feature of the vehicle using the effective pedal position.

20. The vehicle of claim 19, wherein the adaptive cruise control system is further configured to at least facilitate:

measuring a regenerative braking torque for the vehicle;

determining the measure of regenerative braking based at least in part on the regenerative braking torque;

determining a deceleration of the vehicle; and determining a measure of a load for the vehicle; and determining the measure of friction braking based at least in part on the deceleration and the measure of the load.

* * * * *